INVENTORS
Jack L. Long
Robert D. Schweikhardt

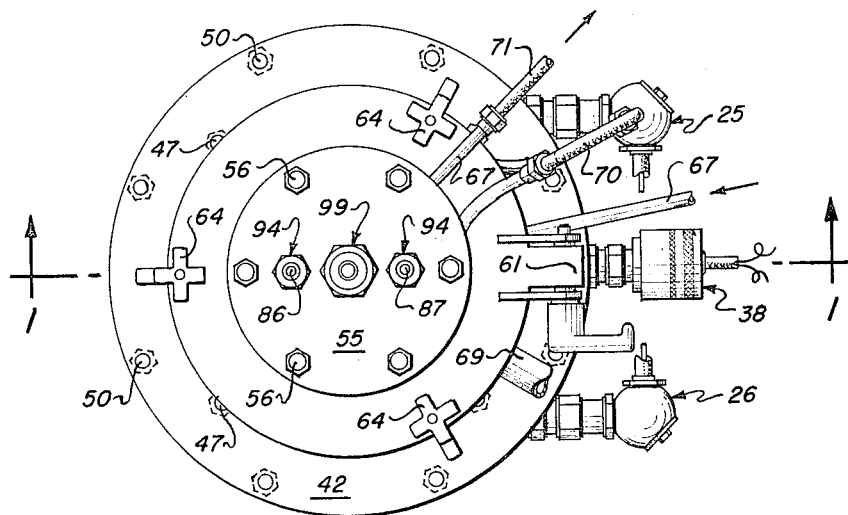
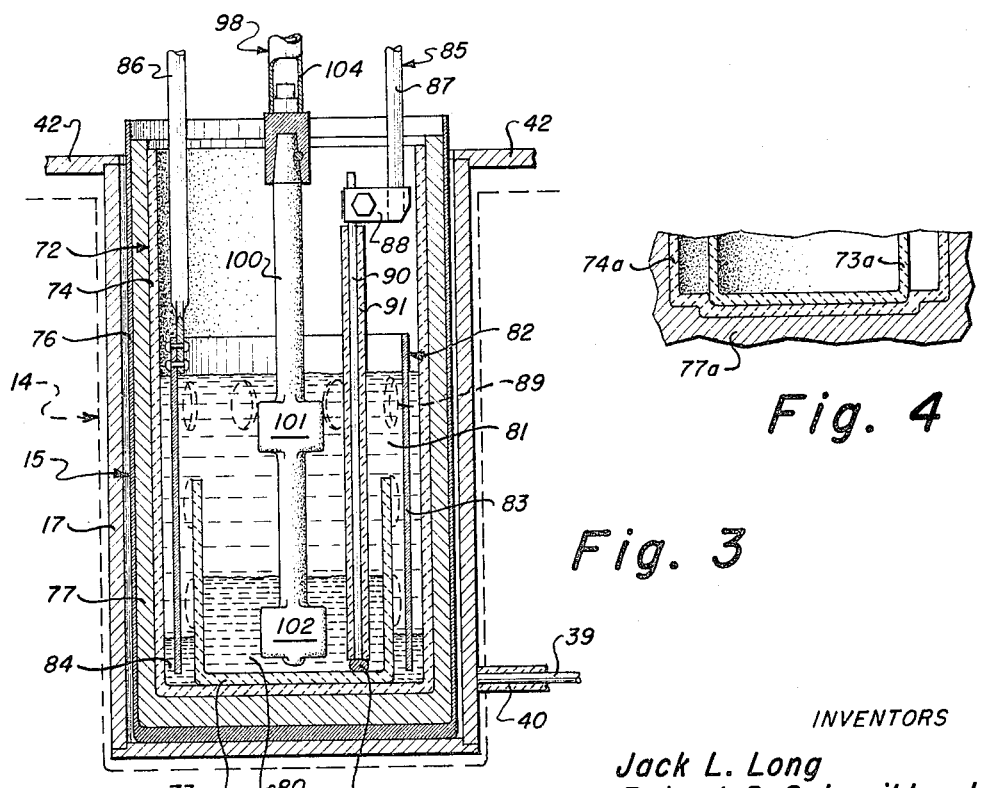

3,282,806
ELECTROREFINING OF PLUTONIUM
Jack L. Long and Robert D. Schweikhardt, Arvada, Colo., assignors to the United States of America as represented by the United States Atomic Energy Commission
Filed Aug. 4, 1965, Ser. No. 477,334
4 Claims. (Cl. 204—1.5)

The present invention relates generally to purification of plutonium and more particularly to improved electrorefining of plutonium metal, wherein the plutonium metal may be deposited using a fused salt solution that is initially devoid of plutonium salt.

Electrolytic purification of plutonium metal, e.g., such as obtained from plutonium-fueled nuclear reactors after having been contaminated with fission products or other contamination, becomes increasingly important due to substantial savings realizable in reprocessing plutonium reactor fuels and to the excellent purification achievable. Generally, electrorefining of plutonium is carried out in a cell provided with an anode, a cathode, and a molten salt electrolyte. Upon the passage of electrical current through the electrolyte plutonium ions are transported to the cathode where they are reduced to metal which thereafter drains down into a product reservoir. To accomplish the electrolysis of plutonium there must be present in the electrolyte plutonium ions in order to start the electrorefining operation. Previous efforts of obtaining plutonium ions in the electrolyte involved the incorporation of a plutonium compound in the fused salt mixture from which the electrolyte was formed. For example, in a fused salt of equimolar sodium chloride (NaCl) and potassium chloride (KCl), about 10 weight percent of plutonium trichloride ($PuCl_3$) was included in order to introduce, when melted, sufficient plutonium ions into the electrolyte for initiating electrolysis.

If the fused salt mixture NaCl-KCl is employed alone as the electrolyte, a preliminary stirring for about 8 to 10 hours prior to commencing of electrorefining is required in order to introduce a sufficient supply of plutonium ions into the electrolyte.

The present invention obviates the need for adding such expensive plutonium compounds to the starting salt or electrolyte and also substantially decreases the stirring time needed, as compared with the 8 to 10 hours when employing only molten NaCl-KCl as electrolyte to introduce sufficient plutonium ions into the molten electrolyte. Applicants discovered that by employing a relatively inexpensive magnesium halide in lieu of heretofore used plutonium compound in the electrolyte a reaction is achieved between the magnesium of the molten electrolyte and the plutonium of the anode to provide the electrolyte with sufficient trivalent plutonium ions to start the electrorefining. Further, required stirring time of the molten electrolyte to introduce plutonium ions into the electrolyte, prior to commencement of electrolysis, is only about ½ to 2 hours, as compared to the previously required 8 to 10 hours where only NaCl-KCl is used. Also, the present invention provides electrorefining cells particularly adaptable to larger scale production, for further reducing overall time and expense of plutonium purification.

An object of the present invention is to provide a new and improved electrolyte for use in plutonium electrorefining.

Another object of the present invention is to provide a new and improved method for electrodepositing plutonium.

A further object of the present invention is to provide method and means for electrodepositing plutonium by which substantial savings in expense and time are realized.

A still further object of the present invention is to provide new and improved electrorefining cells which are particularly adaptable to plutonium electrorefining operations.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Described generally, the method of the present invention comprises employing and heating to molten condition a non-aqueous solution of $NaCl$-$KCl$-$MgCl_2$, with plutonium that is to be refined, agitating or stirring the associated solution and plutonium, and after an appropriate period of such stirring commencing electrolysis.

In the accompanying drawings:

FIG. 2 is a top plan view of the FIG. 1 electrorefining cell;

FIG. 3 is an enlarged elevational sectional view of electrorefining components useable in the FIG. 1 electrorefining cell; and FIG. 4 is a fragmentary sectional view of a mating set of crucibles.

Figure 1:
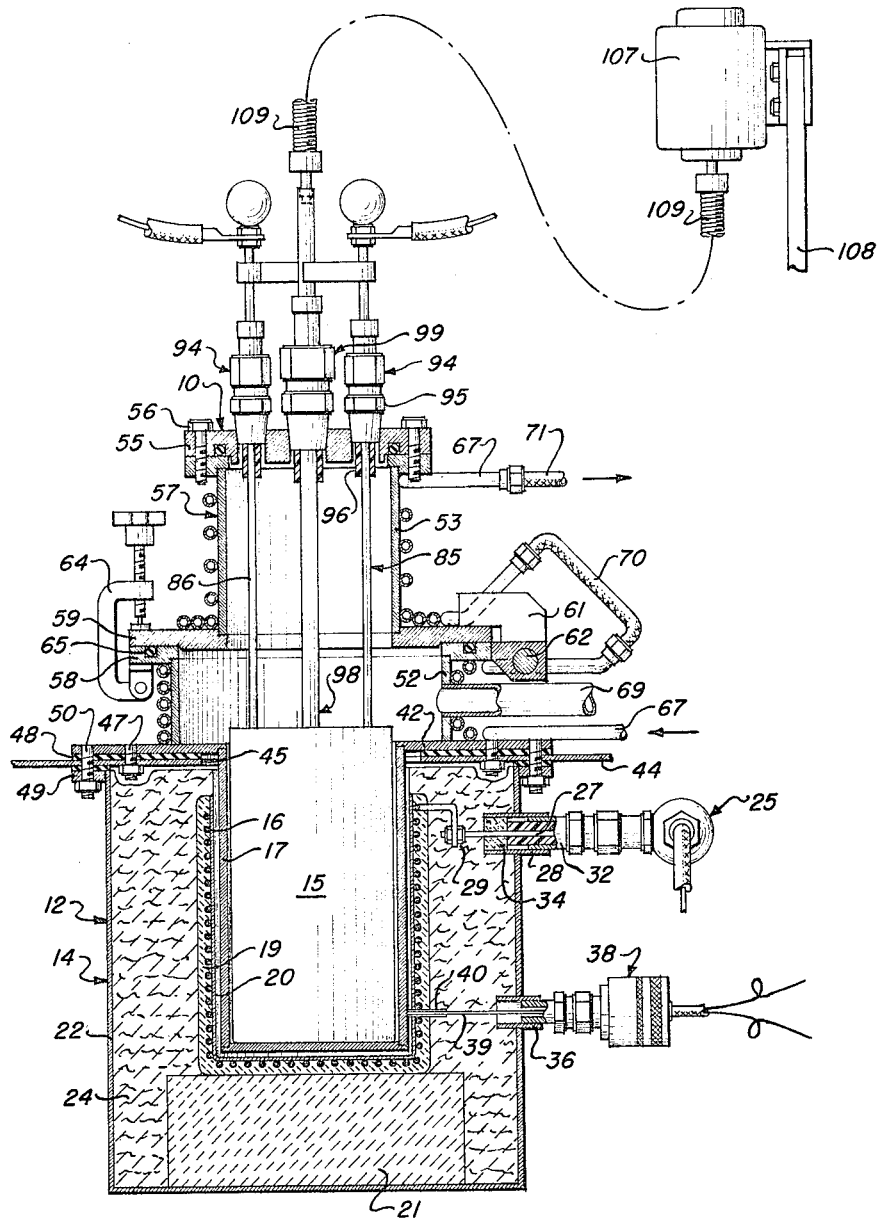
FIG. 1 is a general elevational sectional view of an electrorefining cell for carrying out the novel method of the present invention, taken generally along line 1—1 of FIG. 2 but with some features slightly rotated out of normal position for clarity of illustration.

In the drawings, setting forth apparatus for practicing the method, there is shown an electrorefining cell 10 comprising a furnace assembly 12 having a heating section 14 incorporating an electric heating coil 16 about the sides and bottom of an open-topped tubular receptacle 17 which is adapted to house electrorefining components and charge. The heating section may be two separable portions the first of which may be made up of a refractory furnace liner 19 about the outer surface of a ceramic shell 20 having a cup-like configuration with the heating coil 16 encircling the shell 20 and embedded in the liner 19.

The liner 19 may be supported on a refractory brick 21 carried by a metal furnace jacket 22 and spaced from the side walls of the liner by an annular cavity filled with a suitable heat insulating material 24 such as ceramic fibers. While the annular span is shown filled with the heat insulating material 24 it may be desirable to use a substantially thicker liner 19 and omit the insulating material 24.

Electrical leads connect with the heating coil 16 and are provided with terminals such as at 25 and 26. The terminals may be similar and each may comprise a conductor 27 which projects through a sleeved aperture 28 in the jacket 22 and terminates near the liner 19 or in the liner if the thicker liner is used. Coupling between heating coil and conductor may be achieved by clamping an end of the coil 16 between nuts of a connector 29 threaded to the conductor 27. The conductor may be electrically insulated from the jacket 22 by an insulating tubulation 32 between the jacket sleeve and the conductor 27. Suitable refractory cement 34 may be used in the jacket sleeve to secure the terminal 25 in place.

Sleeved aperture 36 may be provided in the jacket 22 for carrying a thermocouple assembly 38 with the thermocouple probe 39 projecting through an opening in the liner 19 to rest against the side of receptacle 17. A tube 40 of refractory material such as aluminum oxide may be disposed about the portion of the thermocouple probe 39 in and adjacent to the liner 19 to electrically and thermally isolate the thermocuople probe from the heating coil. This thermocouple assembly 38 may be used for controlling furnace temperature. While the thermocouple probe 39 is shown resting against the side of the receptacle 17 it may be disposed in any other suitable position, e.g., against the bottom of the receptacle 17.

The second portion of the heating section 14 comprises the receptacle 17 and an annular metal plate 42 attached to and encircling the upper end of the receptacle. The outer diameter of the receptacle 17 may be less than the inner diameter of the shell 20 so as to provide a slight spacing therebetween when the receptacle is positioned within the heating coil.

The heating section may be secured to suitable supporting structure such as the floor of a glove box or a table or other means, as shown at 44, during the assembly of the heating portions. Such assembly may be accomplished by providing the supporting structure 44 with an aperture 45. The receptacle 17 may be lowered into the aperture 45 and the metal plate 42 secured to the supporting structure 44 by a bolting arrangement shown at 47. A gasket 48 may be positioned between the plate 42 and the supporting structure 44. The first portion of the heating section may then be moved into place about the receptacle 17 and secured to the supporting structure 44 and the place 42 by providing the upper end of the jacket 22 with a flange 49 and by using a bolting arrangement 50 projecting from the flange to provide the coupling. While bolting arrangements 47 and 50 are utilized for attaching the furnace sections to the supporting structure, it will appear clear that a single bolting arrangement such as shown at 50 may be used.

Furnace assembly 12 also includes an upper or closure section for providing the furnace with an enclosed volume to maintain desirable environmental conditions within the cell 10 and for providing support for electrorefining components as will be described below. The upper section may comprise a pair of flanged cylindrical members 52 and 53 stacked one upon the other with the lower member 52 secured to the plate 42 about the receptacle 17 as by welding while the upper member 53 is enclosed at the upper end by a lid 55 which may be removably secured to the upper member 53 by bolts 56 to define with the upper member a furnace cover 57.

In order to facilitate entry into the furnace a hinge construction may be provided between the cylindrical members 52 and 53 by securing annular flanges 58 and 59 to members 52 and 53 respectively, as by welding such that the flanges are disposed in a contiguous relationship one above the other and interconnected by a hinge 61. This hinge 61, which provides the axis about which the furnace cover 57 may rotate to open or close the furnace, may be of any suitable and conventional hinge construction which may include an easily removable "knock-out" pin or dowel 62 for facilitating removal of the upper cylindrical member from the lower member. The flanges 58 and 59 may be held in an abutting or contiguous relationship by one or more easily operated coupling devices spaced about the circumference of the flanges. For example, three "C-clamps" such as shown at 64 may be used to fasten the flanges to each other. A suitable seal such as "O-ring" 65 may be positioned between the flanges 58 and 59 to seal the furnace.

Additionally, the upper section of the furnace 12 may be encircled with tubes 67 through which coolant may be circulated to cool the walls of the upper furnace section, as desired. The tube portion interconnecting the upper and lower cylindrical members and the tube portion extending from the upper member to a coolant supply may incorporate flexible sections as shown at 70 and 71 respectively, to facilitate opening and closing of the furnace cover 57. Also, a suitable conduit 69 may penetrate the lower cylindrical member 52 of the upper furnace section to provide a passageway to the interior of the furnace for evacuating the latter and for filling the furnace with inert gas, e.g., argon used during electrolysis.

The electrorefining components 15 usable in the furnace 12 for the purification of plutonium as best shown in FIG. 3, may comprise a double crucible 72 of refractory material, e.g., magnesia (MgO), with the inner shorter crucible 73 serving as a containment vessel for impure plutonium charge 80 to be refined while the outer crucible 74 serves as the containment vessel for fused salt electrolyte and refined plutonium 84. Side walls of the crucibles are separated from each other by an annulus which serves as a cathode receiving space and as a collecting space for the refined plutonium. The inner and outer crucibles may be formed as an integral unit or cemented together as shown in FIG. 3, or the inner crucible may be a loose fit into a recess in the bottom of the outer crucible, as shown in FIG. 4. The double crucible may be placed into the receptacle 17 of the furnace 12 and is preferably spaced from the receptacle walls by a liner 76 of a suitable materal, e.g., tantalum, adjacent the receptacle 17 and a carrier can 77 of stainless steel (of any suitable thickness) intermediate the liner 76 and the outer crucible. If desired the stainless steel can 77 may be omitted and the tantalum liner 76 may be provided with an annular flange (not shown) at the upper end thereof with peripheral edges of this flange resting against inner perihperal surfaces of a ring secured to the metal plate 42 for assuring proper orientation of the liner 76 in the receptacle 17.

Electrolytic purification of the plutonium is carried out within the crucibles 73 and 74 by partially filling the inner crucible 73 with impure plutonium 80 and utilizing it as the anode, covering the anode and partially filling the outer crucible 74 including the annulus between the crucibles with fused salt electrolyte 81 and positioning a portion of cathode assembly 82 in the electrolyte between the crucibles. The cathode assembly 82 may comprise an open-ended cylinder 83 of a suitable material, e.g., tungsten, of a length sufficient to extend from the bottom or adjacent the bottom of the annulus between the crucibles to a location above the normal level of the electrolyte 81 as shown. The cathode cylinder 83 may be provided with a plurality of apertures 89 to enhance electrolyte circulation. A detailed description of the electrorefining process and the electrolyte is set forth hereinafter.

In order to electrically couple the anode 80 and the cathode assembly 82 to power supplies (not shown) located externally of furnace 12 an anode rod assembly 85 and a cathode rod 86 may project through the furnace lid 55 with the anode assembly 85 being movably mounted in the lid 55 for positioning an end portion of the anode assembly 85 in the inner crucible 73 without opening the furnace. The cathode rod 86, which may be secured to the upper end of the cathode cylinder 83 by suitable means, e.g., rivets or bolting, may also be movably mounted in the lid 55 so as to facilitate moving the cathode cylinder 83 in and out of the outer crucible 74. The anode assembly 85 may comprise an anode rod portion 87 of a suitable material such as tantalum with one end of the rod portion 87 carrying an offset clamping device 88. Another anode rod portion 90 of a suitable material, e.g., tungsten has one end thereof fastened in the offset clamping device 88 and is preferably of a sufficient length that with the other end adjacent to or resting on the bottom of the inner crucible 74 the offset clamping device is disposed above the upper level of the electrolyte 81. The anode rod portion 90 may be provided with a sheath 91 of a suitable electrical insulating material, such as, for example, alumina ($Al_2O_3$), capable of resisting corrosive actions of the electrolyte 81 for assuring that the impure plutonium 80 functions as the anode rather than the tungsten rod 90. A small anode shoe 93 may be provided at the lowermost end of the rod portion 90 to prevent the sheath 91 from slipping off the rod and for providing an electrical coupling with the plutonium anode 80.

The anode rod portion 87 and the cathode rod 86 may extend through apertures in the furnace lid 55 and through suitable rod positioning assemblies disposed on the other surface of the lid 55 that are operable to permit selective positioning of the rods within the closed furnace along with sealing the furnace. One such rod positioning assembly is shown at 94 with the anode rod portion 87 and may comprise a clamping body 95 encircling a sleeve 96 of a suitable electrically insulating plastic material, e.g., "Teflon," which, in turn, encircles the rod portion 87. The clamping body 95 is selectively actuable to force the sleeve 96 or other clamping means against the rod portion 87 to hold the latter in a desired vertical position within the furnace and at the same time seal the furnace, or release the rod for vertical movement in the furnace.

In order to achieve electrorefining, the molten electrolyte 81 and the plutonium anode 80 are preferably stirred prior to and during electrolysis. To provide for this movement of the electrolyte and plutonium anode a stirring assembly 98 may be disposed in the furnace through an aperture in the furnace lid 55 and be provided with a clamping device 99 similar to the rod positioning assembly 94 for selectively positioning the stirring assembly. The stirring assembly 98 may comprise a tip portion 100 of a suitable ceramic material, e.g., magnesia, and of a sufficient length as to extend from a location above the electrolyte level to a location adjacent the bottom of the plutonium anode 80. This ceramic tip portion may be provided with suitable fluid moving means such as the impellers 101 and 102 shown to provide desired stirring of the electrolyte and plutonium anode. Or if desired other fluid moving means may be used on the tip portion in place of impeller 102, such as, for example, a fluted arrangement (not shown) on the lower end of the stirrer tip 100 that is in registry with both the electrolyte and the plutonium anode. The ceramic tip portion 100 may, in turn, be joined to stirrer shaft 104 of a suitable material such as stainless steel in any suitable manner, e.g., by providing the tip portion with a tapered end which may be positioned in a mating tapered receptacle of a coupling and held therein by a suitable pin as shown. The coupling may be secured to the shaft 104 in any appropriate manner, such as welding, brazing etc.

The stirrer shaft 104 extends from the ceramic tip 100 through a bushing in the positioning and sealing device 99 to flexible coupling 109. As with the lower coupling, any suitable means may be used to secure the shaft to the coupling. Rotation of the stirrer assembly 98 may be achieved by a variable speed electric motor 107 removably disposed on a support rod 108 secured to the furnace and coupled to the stirrer shaft 104 by a flexible easily removed coupling 109 so as to facilitate vertical movement of the stirring assembly 98.

The novel salt mixture may be prepared by adding to equimolar NaCl-KCl anywhere from around 2.5 to 9.8 weight percent of $MgCl_2$. This mixture is preferably precast into a solid block as hereinafter described. After melting in the cell, in contact with the impure plutonium metal, the salt solution and molten plutonium are simultaneously stirred for a time of from about ½ to 2 hours, at temperature from about 700° C. to 830° C. Thus sufficient plutonium ions are introduced into the melt so that electrorefining may proceed.

If desired, as a matter of convenience, the novel fused salt electrolyte may be preliminarily prepared by heating a mixture made up of 50 weight percent $MgCl_2$ and 50 weight percent of equimolar NaCl-KCl to about 850° C. for melting the mixture (thereafter bubbling dry hydrogen chloride gas through the melted mixture for about 15 minutes if it is desired to minimize effects of moisture). The mixture may then be cooled to provide a salt casting containing less than 1.5 weight percent magnesium oxide. Portions of this casting may then be added to precast NaCl-KCl to provide desired $MgCl_2$ concentrations in the salt mixture.

In a typical operation (during which, it will be understood, appropriate criticality, safety, and contamination control precautions for handling plutonium are applicable) the double crucible 72 may be loaded with a slug of impure plutonium 80 and the electrolyte salt charge 81 by placing the impure plutonium in the inner crucible 73 and thereafter covering the inner crucible 73 and substantially filling the outer crucible 74 with the electrolyte salt charge, which may be in the form of pieces or blocks. The loaded double crucible 72 may then be placed in the tantalum liner 76 and into the furnace receptacle 17 (and carrier can 77 if utilized).

The anode, cathode, and stirring assemblies should be in or moved into the upper portion of the furnace and held there by the rod and stirrer positioning devices to assure that upon closing the furnace cover 57 the above assemblies do not contact the solid salt charge. The furnace may then be closed by rotating the furnace cover 57 about the hinge 61. The C-clamps 64 may then be tightened to seal the furnace.

The furnace may then be evacuated by a suitable vacuum pumping system (not shown) attached to conduit 69. A satisfactory vacuum may have a leak rate of about 5 microns pressure per minute.

After closing and evacuating the furnace, or at any other desired time, furnace heat up may be initiated by passing an electrical current from a suitable controlled power supply (not shown) through the furnace heating coil 16. The furnace heat up proceeds until a desired holding furnace temperature of about 700° C. to about 900° C. is achieved for liquifying the electrolyte and the plutonium anode (salt temperatures are generally about 70° C. less than furnace temperature). At about 500° C. during furnace heat up the furnace is preferably backfilled with an inert gas, e.g., argon, to a pressure of about 3 pounds per square inch gauge.

With the furnace at its predetermined hold temperature and the electrolyte and plutonium anode in molten states, the rod and stirrer positioning assemblies may be released to permit the lowering of the cathode, anode, and stirring assemblies into their correct positions within the double crucible 72 as shown. The rod and stirrer positioning assemblies may then be retightened to seal the furnace while leaving the stirrer shaft 104 free to turn. The stirrer motor 107 may then be attached to the stirrer shaft 104 through the coupling 109 to begin the stirring of the molten electrolyte and the plutonium anode at desired speed.

During this initial stirring period the reaction $$2Pu° + 3MgCl_2 \rightarrow 2PuCl_3 + 3Mg°$$

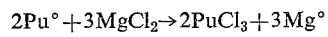

takes place between the $MgCl_2$ of the fused salt and the molten plutonium of the anode to provide suitable plutonium ions in the electrolyte to start electrorefining. About ½ to 2 hours stirring time is adequate to introduce a sufficient quantity of plutonium ions in the electrolyte to proceed with electrolysis.

Prior to the electrorefining of the plutonium of the anode 80 it may be preferable to provide a period of preelectrolysis to provide "clean" electrolyte. The pre-electrolysis step may be achieved by making the anode negative and the cathode positive and then preelectrolyzing for about ½ hour at about 3 amperes and about 1.5 volts direct current.

Electrolysis may then be started by returning the anode and cathode to positive and negative polarities respectively, and providing an electrical current of about 10 to 40 amperes D.C. constant current. The particular current setting within the above range is selected for the time length of the electrolysis run desired. During electrolysis the plutonium ions are transported to the cathode where they are converted to plutonium metal 84 which drains down into the product reservoir provided in the annulus between the inner and outer crucibles.

During the time interval in which electrolysis proceeds to completion, desired changes in electrolysis current, furnace temperature, stirrer speed, etc. may be made. Completion of electrolysis may be determined in several ways, such as, for example, a back E.M.F. greater than 0.3 of a volt, a sudden increase in resistance, or by a calculation of theoretical yield. Upon completion of the electrolysis run the electrolysis current supply is shut off, the stirrer stopped, and the cathode, anode, and stirrer assemblies retracted out of the double crucible 72 into the upper part of the furnace.

When the furnace has cooled sufficiently the argon supply may be turned off and the furnace cover 57 opened by releasing the C-clamps 64 and rotating the cover 57 about the hinge 61. The tantalum liner 76 (or carrier can 77 if the latter is used) and its contents may then be removed and transferred to a "breakout" area for subsequent separation and weighing of the various parts of the run including the product metal 84 anode residue, loose metal beads, electrolyte, and ceramic or refractory fragments.

The resulting product metal is substantially purer than the feed material used as the anode. For example, plutonium metal with more than 7400 parts per million (p.p.m.) impurities may be refined to less than 200 p.p.m. total detectable impurities. The use of the $MgCl_2$ in the electrolyte does not detrimentally affect the purification of the plutonium; while magnesium content generally increases from impure feed metal to refined metal, magnesium content decreases when the electrofied metal is vacuum cast. For example, in one run magnesium content went from 10 p.p.m. in electrorefined metal to 3 p.p.m. in cast metal.

In the below table there are set forth stirring times and results achieved utilizing the mixture of NaCl-KCl with 2½ weight percent $MgCl_2$ successfully in a number of electrorefining runs.

It will be seen that the present invention provides significant advantages in the field of plutonium electrorefining due to the savings realized in obviating the previous requirement of initial expense plutonium compounds in the starting electrolyte, and in that use of $MgCl_2$ provides for rapidly introducing plutonium ions into the electrolyte by chemical reaction, only ½ to 2 hours as compared with the 8 to 10 hours formerly required without $MgCl_2$.

As various changes may be made in the form, construction and arrangement of parts herein without departing from the spirit and scope of the invention and without sacrificing any of its advantages, it is to be understood that all matter herein is to be interpreted as illustrative and not in a limiting sense.

We claim:

1. The plutonium electrorefining process which comprises melting in contact with plutonium to form an electrolyte and molten plutonium a mixture including magnesium chloride with sodium chloride and potassium chloride, maintaining the melted electrolyte and molten plutonium at a temperature of from about 700° C. to about 830° C. and simultaneously stirring the same for a period of from about 30 to 120 minutes to acquire a supply of plutonium ions in the melted electrolyte, and thereafter initiating electrolysis through the electrolyte.

2. The process of claim 1 wherein the melted electrolyte consists essentially of magnesium chloride together with an equimolar mixture of sodium chloride and potassium chloride.

3. The process of claim 2 wherein the electrolyte contains about 2.5 to about 9.8 weight percent magnesium chloride.

4. The method of claim 1, wherein electrolysis is conducted at from about 10 to about 40 amperes direct current.

| Run No. | Impure Charge, Wgt. gms. | Refined Product, Wgt. gms. | Furnace Temp., °C. | Pre-Electrolysis, Time, Min. |
|---|---|---|---|---|
| 1 | 2,924 | 2,253 | 770 | 60 |
| 2 | 2,650 | 2,329 | 720 | 60 |
| 3 | 2,130 | 1,268 | 790 | 60 |
| 4 | 972 | 626 | 780 | 60 |
| 5 | 1,002 | 629 | 770 | 60 |
| 6 | 2,811 | 1,643 | 820 | 30 |
| 7 | 2,762 | 1,721 | 790 | 60 |
| 8 | 2,756 | 2,251 | 730 | 60 |
| 9 | 2,888 | 2,020 | 780 | 60 |
| 10 | 2,471 | 1,219 | 820 | 60 |
| 11 | 2,523 | 1,439 | 780 | 60 |
| 12 | 2,707 | 1,585 | 800 | 30 |
| 13 | 2,699 | 2,371 | 900 | 30 |

References Cited by the Examiner

UNITED STATES PATENTS 2,893,928  7/1959  Kolodney _____ 204—1.5
3,098,028  7/1963  Mullins et al. _____ 204—1.5 X

OTHER REFERENCES

Industrial and Engineering Chemistry Process and Development, vol. 2, No. 1, January 1963, pp. 20–24.

References Cited by the Applicant

UNITED STATES PATENTS 2,923,670  2/1960  Bjorklund et al.

REUBEN EPSTEIN, *Primary Examiner.*